United States Patent [19]

Bollen

[11] Patent Number: 5,549,996
[45] Date of Patent: Aug. 27, 1996

[54] METHOD FOR PROVIDING HARD COPIES OF RADIOLOGICAL IMAGES

[75] Inventor: Romain Bollen, Sint-Truiden, Belgium

[73] Assignee: AGFA-Gevaert, N.V., Mortsel, Belgium

[21] Appl. No.: 404,085

[22] Filed: Mar. 14, 1995

[30] Foreign Application Priority Data

Apr. 22, 1994 [BE] Belgium .................. 94201111

[51] Int. Cl.$^6$ .................. G03C 11/00; G06F 15/00; G06K 9/62
[52] U.S. Cl. .................. 430/21; 430/20; 430/22; 364/413.13; 364/413.14; 364/413.19; 382/132; 382/168; 382/171; 382/173
[58] Field of Search .................. 430/20, 21, 22; 382/168, 171, 173, 132; 364/413.13, 413.14, 413.19

[56] References Cited

U.S. PATENT DOCUMENTS

| 4,952,805 | 8/1990 | Tanaka | 250/327.2 |
| 4,977,504 | 12/1990 | Funahashi | 364/413.13 |
| 5,341,436 | 8/1994 | Scott | 382/168 |
| 5,447,811 | 9/1995 | Buhr et al. | 430/20 |

*Primary Examiner*—Hoa Van Le
*Attorney, Agent, or Firm*—Breiner & Breiner

[57] ABSTRACT

A method for representing radiological images on a recording medium comprising an image recording layer and an opaque reflecting support is provided comprising the steps of:

(i) recording said image directly in an digital form or recording said image as an analog image and transforming said analog image into a digital image, (ii) determining a raw image histogram of said digital image (iii) determining from said histogram the width of said diagnostically useful window (iv) dividing said useful window into several smaller windows, the width of said smaller windows being adapted to the dynamic range of said recording medium (v) feeding digital image data of each of said smaller windows to an imager (vi) printing the information content of each of said smaller windows onto said image recording medium.

15 Claims, No Drawings

METHOD FOR PROVIDING HARD COPIES OF RADIOLOGICAL IMAGES

FIELD OF THE INVENTION

The present invention relates to a method for representing images of the interior of the human body obtained during medical diagnosis. In particular, but not exclusively, this invention relates to a method for representing images obtained during X-ray diagnosis that were converted to or were available in digital form.

BACKGROUND OF THE INVENTION

Numerous "radiological examination procedures" already directly provide "radiological images", suitable for diagnostic evaluation, in digital form. Hereinafter the term "radiological examination procedures" has to be understood as those examination procedures that give an image of the interior of a body irrespective of the ways in which said image is created. E.g. ultrasonography, medical thermography, magnetic resonance imaging, positron emission tomography (PET), etc are, for the understanding of the present invention, included, together with procedure using X-rays, in the term radiological examination procedures. The term "radiological image" has to be understood as the image generated by said "radiological examination procedures" and the term "radiological department" has to be understood as this department of a hospital or as a private practice where "radiological examination procedures" are performed.

Examples of radiological examination procedures directly providing images, suitable for diagnostic evaluation, in digital form include digital subtraction angiography, magnetic resonance imaging, computer aided tomography, computed radiography etc. Computed radiography is described in, e.g., U.S. Pat. No. 3,859,527, where an X-ray recording system is disclosed wherein photostimulable storage phosphors are used having, in addition to their immediate light emission (prompt emission) upon X-ray irradiation, the property to store temporarily a large part of the absorbed X-ray energy. Said energy is set free by photostimulation in the form of fluorescent light different in wavelength from the light used in the photostimulation. In said X-ray recording system the light emitted on photostimulation is detected photoelectronically and transformed into sequential electrical signals. This recording method gives an X-ray image in digital form.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed in an automatic developing machine to form therein a silver image in conformity with the X-ray image. The analog image which is recorded in said photographic silver halide emulsion layer can be converted into a digital form either by digitizing said analog image after diagnosis or by digitizing said analog image directly when it sorts out of said developing machine. Means for directly digitizing analog X-ray images recorded on silver halide emulsion layers are described in e.g. EP-A 452571.

In many "radiological examination procedures" which deliver a "radiological image" in digital form, sensors having a good signal to noise ratio over a large dynamic range. This is especially the case with computed radiography and computed tomography.

While the diagnosis is preformed by a human observer, the digital image as obtained, containing diagnostically important information within a wide amplitude range, has to be represented in a human readable (analog) form. This is done by representing the image on a film hardcopy (to be viewed on a lightbox) or on a display screen. In both case the contrast of anatomic detail, as present in the digital image, must always be traded of against dynamic range of the medium on which said digital image is represented. Given the limited dynamic range of the image output medium (smaller than 500:1 in case of a transparent film, and smaller than 100:1 in case of a CRT screen under normal viewing conditions) then the tradeoff can be stated extremely as follows:

i) if the entire dynamic range of the diagnostically meaningful signal levels is mapped onto the available output medium dynamic range, then overall contrast will be very low, and for many subtle, diagnostically important details, the image contrast will be below the perceptual threshold level, hence these will be missed by the observer.

ii) if at the other hand only a part of the original dynamic range is mapped onto the output medium dynamic range then all signal levels below this range will all be mapped onto the same (low) output level, and all original levels exceeding this range will be mapped onto the same (high) output level.

In that case only those image pixels having a level within the selected dynamic range will be presented with acceptable contrast, while the other pixels will have uniform brightness, and will show up with no contrast at all.

In image workstations connected to a computed radiography or computed tomography system the desired compromise between both extreme mappings is interactively selectable, a feature which is commonly referred to as window/level setting. This problem is largely recognized in the field of digital radiology, see: Maack I., Neitzel U., "Optimized Image Processing for Routine Digital Radiography", Proceedings International Symposium CAR '91, p. 109, Springer Verlag. A possible solution to this problem is described in e.g. EP-A 527 525.

For making hardcopy images almost exclusively recording media comprising a transparent support are used, while the dynamic range of a recordium medium comprising an opaque, reflecting support is at best 80:1, and in some cases even only 50:1. When the entire dynamic range of the diagnostically meaningful signal levels is mapped onto the available dynamic range of a recording medium comprising an opaque, reflecting support, even more information will be lost.

Usually radiological examination procedures are performed in a radiological department of a hospital on demand of a doctor. This doctor can belong to an internal service of the hospital or can be a phisician working outside of the hospital and is called "the referring physician".

After diagnosis the diagnostician writes a protocol of his findings (i.e. text describing the diagnostillay relevant information that is contained in the radiological image) and sends copies of the radiological images together with said protocol to the referring physician.

Since the radiological image is printed on a recording medium with a transparent support, said physician needs a viewing box to view the radiological images. It would for the referring physician be more convinient if it would be possible to print radiological images onto a recording medium comprising an opaque reflecting support. Such a material would eliminating the need of a viewing box an make it more convenient for showing the radiological print to the patient. Moreover, on a recording material having an opaque reflecting support it is possible to have the radiological image and the protocol of the radiologist printed on the same sheet. Having both the radiological image and the protocol inseperably bounded together will avoid possible mix-ups between radiological images and protocols: the referring physician is always certain that protocol that he receives from the radiologist refers to the radiological image.

Using hard copies of radiological images on an opaque reflecting support has advantages both from the viewpoint of convenience and from the viewpoint of costs. Recording media on an opaque reflecting support are usually less expensive than recording materials on a transparent support and it is for the referring physician more convenient to show the radiological image to the patient when the referring physician does not need a viewing box to show said images.

Although it would be easier for the referring physician to have a radiological image printed on a recording medium comprising an opaque, reflecting support, it has up until now been necessary to print the radiological images onto a recording medium comprising a transparent support, since the printing on a recording medium comprising an opaque reflecting support to much of diagnostically relevant information may be lost.

There is thus still a need to provide the "referring physician" with "radiological images" printed together with the protocol describing the radiological image on a recording medium comprising an opaque reflecting support and there is still the need for a method that enables to print radiological images on a recording material, comprising an opaque reflecting support, without loss of diagnostically relevant information, especially if the original digital image is sensed by sensors having a good signal to noise ratio over a large dynamic range.

OBJECT AND SUMMARY OF THE INVENTION

It is an object of the invention to provide the referring physician with a radiological image viewable in reflection mode.

It is a further object of the invention to provide a method for printing radiological images on a recording material, that can be viewed in reflection, without loss of diagnostical information.

It is a still further object to provide a method for printing radiological images on a recording material, that can be viewed in reflection, without enlarging nor compressing the dynamic range.

It is an other object of the invention to provide means to print a hard copy of a radiological image, that can be viewed in reflection, without enlarging nor compressing the dynamic range, together with the text of the protocol on a single sheet of recording material.

Other objects and advantages of the present invention will become clear from the detailed description hereinafter.

The objects of the invention are realized by providing a method for representing X-ray images on a recording medium comprising an image recording layer and an opaque reflecting support characterized by the steps of:

(i) recording said image directly in an digital form or recording said image as an analog image and transforming said analog image into a digital image, (ii) determining a raw image histogram of said digital image (iii) determining from said histogram the width of a diagnostically useful window (iv) dividing said useful window into several smaller windows, the width of said smaller windows being adapted to the dynamic range of said recording medium (v) feeding digital image data of each of said smaller windows to an imager (vi) printing the information content of each of said smaller windows onto said image recording medium.

In a preferred embodiment said information content of each of said several smaller windows is printed so as to have all images of said smaller windows together on a single sheet of said recording medium.

In a further preferred embodiment a method is provided for printing radiological images in combination with the protocol describing said radiological images on a single sheet of recording material characterised by the steps of:

(i) recording said image directly in an digital form or recording said image as an analog image and transforming said analog image into a digital image, (ii) determining a raw image histogram of said digital image (iii) determining from said histogram the width of a diagnostically useful window (iv) dividing said useful window into several smaller windows, the width of said smaller windows being adapted to the dynamic range of said recording medium (v) combining digital image data, describing said smaller windows, with digital text data of said protocol (vi) feeding said combined digital image data and digital text data to an imager (vii) printing said combined digital data onto a single sheet of said image recording medium.

DETAILED DESCRIPTION OF THE INVENTION

From the digital image a raw image histogram is determined, i.e. a representation of the number of pixels present in the image for each grey value (or intensity). Each radiological examination has its own histogram depending on the difference of attenuation of the X-ray radiation by the various parts of the object being examined. On said histogram a useful window and level are selected by an algorithm: the useful window has a certain "width", i.e. the range of grey values that contain diagnostically relevant information. Each window has a "level", being the center of the range of grey values comprised within said window. Only data concerning grey values comprised in said window are represented in the hardcopy image, and become available for diagnosis. Therefore data within the window are mapped onto the available density range of an hard copy material in accordance with, e.g., an S-shaped mapping curve. Data outside said window are mapped onto minimum density ($D_{min}$) or maximum density ($D_{max}$) of the recording medium. The appearance of said hardcopy image is determined by the selection of a sensitometric curve, this is done by the use of a "look-up table". By a look-up table the differences in grey level, contained in said window, are transformed in different electric signals use to drive the writing means that are used to print a human readable image in a so called "imager".

The width (W) of useful windows in "radiological images" varies between a minimum value ($W_{min}$) and a maximum value ($W_{max}$). For bone examinations e.g. $W_{min}$ relates to $W_{max}$ as 1:50 and for examinations of the chest e.g. $W_{min}$ relates to $W_{max}$ as 1:1000.

The splitting of said diagnostically useful window into several smaller windows for the representation of radiological images on a recording medium comprising an opaque, reflecting support proceeds through the steps of:

(i) determining a raw image histogram with a $W_{min}$ as lower limit and $W_{max}$ as upper limit and recalculating said lower and upper limit such that $W_{min}=1$, in this way log $W_{min}=0$ and log $W_{max}=\log W$.

(ii) comparing log W to the logarithm of the dynamic range (log DR) of the recording medium comprising an opaque, reflecting support:

$$\frac{\log W}{\log DR} = a$$

Rounding the value a to the next higher integer, giving the number of portions in which the width of the window containing diagnostically relevant information has to be divided to have portions that each fit into the dynamic range of the recording medium comprising a opaque, reflecting support.

(iii) not dividing the width of the window containing diagnostically relevant information when a<1.

(iv) dividing the width of said window in portions as follows when a>1:

(i) determining a first portion ($Por_1$) extending from 0 to log DR and a last protion ($Por_{LO}$) extends from (log W-log DR)=b to log W.

(ii) not further dividing of the width of the window containing diagnostically relevant information when 1<a <2.

(iii) when a>2, further dividing said width of said window as follows:

dividing the difference between b (log W-log DR) and log DR by log DR:

$$\frac{\log W - 2 \log DR}{\log DR} = a - 2 = c$$

and rounding the value c to the next higher integer.

inserting one other portion of the total width of the window containing diagnostically relevant information, having a dynamic range equal to the dynamic range of the recording medium comprising a opaque, reflecting support, chosen in the middle of said width of said window, between $Por_1$ and $Por_{LO}$, when c=1.

In most cases c will not be greater than 1, and the splitting of the diagnostically useful window can stop after step (iii).

In the case when 1<c≦2, two more portions of the total width of the window containing diagnostically relevant information, can be inserted between $Por_1$ and $Por_{LO}$. One portion, $Por_2$ extends from log DR to 2 log DR and a second portion, $Por_{L1}$, extends from Log W-2 log DR to log W-log DR.

$Por_{LO}$, $Por_1$ and when necessary $Por_{L1}$ and $Por_2$ are printed by a recording material. It is preferred to print all portions on a single sheet of film, such as to provide the "referring physician" with the total information content of the radiologically useful window on a single sheet.

When the Region Of Interest (ROI), i.e. the region where the lesion is situated in the original total diagnostically useful window, has only a limited dynamic range, that is equal or smaller than the dynamic range of a recording material, comprising an opaque reflecting support, the splitting of the total diagnostically useful window can proceed differently: The ROI is printed, and the remaining portions of the original total diagnostically useful window which are only necessary to locate the ROI in the larger context of the examination, but which are not necessary to understand the diagnosis, can be compressed, with information loss, such as to fit the dynamic range of a recording material, comprising an opaque reflecting support.

It is another object of the invention to provide a convenient method to combine the hard copy of a radiological image and the protocol of the radiologist on a single sheet of recording material. To realise this object, a method is provide for printing radiological images, as defined hereinafter, in combination with the protocol describing said radiological images on a single sheet of recording material characterised by the steps of:

(i) recording said image directly in an digital form or recording said image as an analog image and transforming said analog image into a digital image, (ii) determining a raw image histogram of said digital image (iii) determining from said histogram the width of a diagnostically useful window (iv) dividing said useful window into several smaller windows, the width of said smaller windows being adapted to the dynamic range of said recording medium (v) combining digital image data, describing said smaller windows, with digital text data of said protocol (vi) feeding said combined digital image data and digital text data to an imager (vii) printing said combined digital data onto a single sheet of said image recording medium.

Said combination of digital image data and digital text data can be performed by any algorithm that has been designed to combine graphics (images with various gray levels) and text in one digital file. E.g., the text data can be bit mapped.

The information contents of the portions, $Por_{LO}$, $Por_1$, $Por_{L1}$ and $Por_2$, of the diagnostically useful window and the text data are available in digital form and this digital information can be converted to electric pulses and then through a driver circuit selectively, imagewise transferred to a writing means to print this digital information on a receiver to yield an analog image.

Said writing means, that can be modulated imagewise, can be of any type known in the art.

It can be, i.a.:

light emitting means (e.g. a laser, light emitting diodes, conventional light sources combined with spatial light modulators, etc.)

heat emitting means (e.g. lasers, thermal printheads, etc). In thermal printheads the imagewise modulation of the writing means proceeds through an imagewise conversion of electrical energy into heat within microscopic heat resistor elements.

electrographic means, e.g. an Direct Electrographic Printing (DEP) device as disclosed in, e.g., U.S. Pat. No. 3,689,935, European Application 94200855.8 filed on Mar. 29, 1994., etc. In a DEP device the imagewise modulation of the writing means proceeds by an imagewise modulation of electric potentials around apertures in a printhead. In this way the stream of charged toner particles through the apertures of the printhead is modulated.

ink-jet printing means where the imagewise modulation of the writing means proceeds through an image wise modulation of an ink-jet printhead.

The combination of text data (the protocol of the radiologist, describing the image) and image data (i.e. the information contents of the portions, $Por_{L0}$, $Por_1$, $Por_{L1}$ and $Por_2$, of the diagnostically useful window) to make them both printable with the same imager is not so straightforward an operation. This is especially so when both types data (image and protocol) will be printed by a laser imager on a silver halide photographic material. It is possible to use so called Image Management and Communication Systems (IMACS), i.e. digital networks that integrate image acquisition modalities with view stations, digital archiving devices and the Radiology Information System (RIS) of the radiological department. Due to the high costs of such IMACS, these systems are not yet readily available. Therefore it would be benificial if the information contents of the portions, $Por_{L0}$, $Por_1$, $Por_{L1}$ and $Por_2$, of the diagnostically useful window could be printed with a laser printer on a silver halide photographic material and that after processing said silver halide photographic material, the text data (the protocol describing the image) could be printed by a normal office printer. One of the most important office printing techniques is electro(photo)graphic printing in which thermoplastic resin-containing toner particles are transferred from electrostatic charge patterns to a receiving material and fixed thereon by heat. Another popular printing technique is ink-jet printing in which tiny drops of ink fluid are projected onto an ink receptor surface.

It has been found that a silver halide photographic material comprising an opaque reflecting support and at least one hydrophilic colloid outermost layer, wherein said outermost layer contains gelatin as a binding agent together with polymeric spacing particles in an amount of at least 0.05 $g/m^2$ and with an average particle diameter of at least 4 µm, can easily be printed on said outermost layer by both ink-jet and electro(photo)graphic office printers. The outermost layer can be situated on top of the silver halide emulsion layer(s) or on the side of the support opposite to the silver halide emulsion layer(s) or two outermost layer can be present one on top of the silver halide emulsion layers and one on the side of the support opposite to the silver halide emulsion layer(s). Preferably said outermost layer is situated on top the silver halide emulsion layer(s) and the amount of polymeric spacing particles is at least 0.10 $g/m^2$ and said polymeric spacing particles have an average particle diameter of at least 6 µm.

Suitable polymeric spacing particles may be made i.a. of polymethyl methacrylate, of copolymers of acrylic acid and methyl methacrylate, and of hydroxypropylmethyl cellulose hexahydrophthalate. Preferred polymeric spacing particles have been described in U.S. Pat. No. 4,614,708.

So the invention also provides a method for representing X-ray images together with the protocol describing said images on a recording medium comprising a silver halide emulsion layer, an outermost layer comprising at least 0.05 $g/m^2$ of polymeric spacing particle, said spacing particles having an average diameter of at least 4 µm and an opaque reflecting support characterized by the steps of:

(i) recording said image directly in an digital form or recording said image as an analog image and transforming said analog image into a digital image, (ii) determining a raw image histogram of said digital image (iii) determining from said histogram the width of a diagnostically useful window (iv) dividing said useful window into several smaller windows, the width of said smaller windows being adapted to the dynamic range of said recording medium (v) feeding digital image data of each of said smaller windows to a laser imager (vi) printing the information content of each of said smaller windows onto said recording medium (vii) processing said recording medium, comprising a silver halide emulsion layer in an automatic processing apparatus and (viii) printing the protocol, describing said image onto said processed recording medium by means of an ink-jet printer or an electo(stato)graphic printing method.

Recording materials that enable the recording of radiological images for viewing in reflection have been rarely used. Almost only in ultrasonography recording media comprising an opaque support are used for the recording of images. In EP 276497 the use of a conventional radiographic system (i.e. a system essentially comprising film interposed between intensifying screens) comprising a film coated on a white support, with diffuse reflection density lower than 0.30 is disclosed, in such a system it is possible to record multiple (two) X-ray images, with high information content, in a single shot and with low X-ray doses. In this system however the two image are located on opposite sides of the recording medium and are mirror images. Also the white light diffuse reflection density, disclosed in EP 276 497, is much lower than the white light reflection density as understood in the present invention. In the present invention, the opaque, reflecting support has a white light transmittance of at most 10, preferably at most 5%. As opaque reflecting support for a recording medium used to represent radiological images according to the method of the present invention it is possible to use any opaque reflecting supports, known in the art, e.g., white paper, baryta paper, polyethylene coated paper, etc.

The support for the recording medium to be used according to this invention is preferably an opaque reflecting polymeric support. This is especially so when the recording medium, used in the method according to the present invention is a silver halide material.

Opaque reflecting potymeric supports, useful as a support for the recording medium to be used according to this invention, are e.g. polyethyleneterephthalate films comprising a white pigment, as described in e.g. U.S. Pat. No. 4,780,402, EP-B 182 253. Preferred however are polyethyleneterephthalate films comprising discrete particles of a homopolymer or copolymer of ethylene or propylene as described in e.g. U.S. Pat. No. 4,187,113. Most preferred are opaque reflecting supports comprising a multi-ply film wherein one layer of said-multi ply film is a polyethyleneterephthalate film comprising discrete particles of a homopolymer or copolymer of ethylene or propylene and at least one other layer is a polyethyleneterephthalate film comprising a white pigment as described in e.g. EP-A 582 750 and Japanese non examined application JN 63/200147.

When the information, contained in the portions, $Por_{L0}$, $Por_1$, $Por_{L1}$ and $Por_2$, of the diagnostically useful window are printed by an imagewise modulated light emitting means, this information can be printed on, e.g., a photoconductive drum as used in known electrophotographic processes. In classical electrography a latent electrostatic image on a charge retentive surface is developed by a suitable material to make the latent image visible and the powder image is either fused directly to said charge rententive surface, which then results in a direct electrographic print, or is subsequently transferred to the final substrate and then fused to that medium, the latter process resulting in a indirect electrographic print.

When the information, contained in the portions, $Por_{L0}$, $Por_1$, $Por_{L1}$ and $Por_2$, of the diagnostically useful window are printed by an imagewise modulated light emitting means, it is preferably printed by a laser imager onto a silver halide photosensitive material. A laser imager is a digital system containing a high performance digital computer. Instead of just printing the images, the incoming images can be stored temporarily in an electronic memory and the data as well as the lay-out of the images can be manipulated before actually being printed on a film. This electronic memory offers the possibility to buffer the incoming data from several diagnostic modalities by means of an image network. A laser imager usually provides radiological images on a recording medium comprising a silver halide recording layer and a transparent polymeric support. A laser imager comprises usually a dry film handling/exposing section and an automatic film processing section. This automatic film processing section is usually directly coupled to the dry film handling/exposing section of a laser imager.

When a laser imager is implemented in an image network, the access time of the laser hardcopy material should be as short as possible. Factors responsible for delayed rates at which the process proceeds may be the exposure time of the film by the laser, the transport time before exposure to the system and after exposure to an automatic processor, and the processing time, dry-to-dry, of the hardcopy material. Typical modern processors have dry-to-dry cycles of less than 60 seconds, more preferable less than or equal to 50 seconds. A typical example of a laser imager comprising a dry film handling/exposing section directly coupled to an automatic film processing section having a dry-to-dry cycle of less than 60 seconds, is the laser imager MATRIX LR 3300 coupled to the CURIX HT530 automatic filmprocessor, (both MATRIX LR 3300 and CURIX HT530 are tradename products marketed by Agfa-Gevaert NV, Mortsel). Such a high speed laser imager is the core of a network in such a way that one laser imager can print images from various radiological procedures in one central location.

It is clear that within the scope of this invention any combination of a laser imager and a processing unit fulfilling the respective requirements for both of them in accordance with this invention may be used and is not limited to the laser imagers and processors described hereinbefore.

Silver halide crystals used in the photographic materials, preferred to be used according to the present invention may be any type of photosensitive silver halide, e.g. silver bromide, silver chloride, silver chloroiodide, silver bromoiodide or silver chlorobromoiodide or mixtures thereof. The particle size is preferably in the range of 0.1 to 1.2 µm.

It is preferred that said photographic material can be developed in an automatic processor with dry-to-dry cycle of at most 60 sec. Therefore, preferred emulsions for the silver halide recording material to be used in the present invention are emulsions comprising cubic silver bromide or silver bromoiodide crystals with an amount of at most 3 mole% of iodide. Preferably the particle size distribution of silver bromide or silver bromoiodide crystals, comprised in the emulsions for use according to the present invention, is monodisperse. A monodisperse size distribution is obtained when 95% of the grains have a size that does not deviate more than 30% from the average grain size. The average particle size of said monodisperse cubic silver halide crystals, expressed as the length of the edge of said cubic crystals, is preferably between 0.2 and 0.4 µm. Most preferably said average particles size is between 0.25 and 0.35 µm.

A preferred silver halide recording material, to be used according to the present invention, is processable in a processor with a dry-to-dry cycle of less than 60 seconds, or more preferable in a processor with a dry-to-dry cycle of less than or equal to 50 seconds. Said silver halide material will preferably also be processable in hardener-free processing baths (developer and fixer). This demand for processing medical images in hardener free developing and fixing baths is gaining more and more importance. Hardener free chemistry offers higher convenience with regard to ecology, manipulation and regeneration of chemicals in the automatic processor provided that the hardcopy material has the expected sensitometric results as e.g. sensitivity, gradation and maximum density within restricted processing time limits. The hardening agent reduces the drying time in the automatic processor by crosslinking the gelatin chains of the photographic material, thereby reducing the water adsorption of said material. Therefore, a photographic material suited for hardener free processing should be pre-hardened during emulsion coating in order to allow a short dry-to-dry processing cycle.

Since the drying characteristics in the processor are mainly determined by the water adsorption of the hydrophylic layers of the photographic material, and since the water adsorption is directly proportional to the gelatin content of the layers and inversely proportional to the amount of hardener, added to the layer, its composition is optimized with a low gelatin content and a high hardening degree so as to attain the object of this invention to allow hardener free processing within 50 seconds dry-to-dry cycle time.

In a preferred embodiment, a total amount of gelatin of less than 4 $g/m^2$ per side is present.

A silver halide recording material, preferred for use in a method according to the present invention, and comprising essentially gelatin as the hydrophilic binder, can be pre-hardened with appropriate hardening agents such as those of the epoxide type, those of the ethylenimine type, those of the vinylsulfone type e.g. 1,3-vinylsulphonyl-2-propanol, chromium salts e.g. chromium acetate and chromium alum, aldehydes e.g. formaldehyde, glyoxal, and glutaraldehyde, N-methylol compounds e.g. dimethylolurea and methyloldimethylhydantoin, dioxan derivatives e.g. 2,3-dihydroxy-dioxan, active vinyl compounds e.g. 1,3,5-triacryloylhexahydro-s-triazine, active halogen compounds e.g. 2,4-dichloro-6-hydroxy-s-triazine, and mucohalogenic acids e.g. mucochloric acid and mucophenoxychloric acid. These hardeners can be used alone or in combination. The binders can also be hardened with fast-reacting hardeners such as carbamoylpyridinium salts.

Preferred hardening agents for silver halide materials to be used according to this invention are formaldehyd and phloroglucinol, added respectively to the protective layer(s) and to the emulsion layer(s).

For silver halide materials to be used in a method according to the present invention, a hardening degree, of the hydrophilic layers present on the emulsion side of the material, corresponding with a water absorption of the unexposed material of less than 8 $g/m^2$ when measured according to TEST A is preferred.

TEST A

The said water absorption is measured as follows:

the dry film is kept for 15 minutes in a conditioning room at 20° C. and 30% RH, when present, the backing topcoat layer of the dry film is covered with a water impermeable tape, weighing the dry film, the unexposed material is immersed in demineralized water of 24° C. for 10 minutes, the excessive amount of water present on top of the outermost layers is sucked away and the weight of the wet film is immediately determined and the difference between the measured weight of the wet film and of the measured weight of the dry film is measured and normalised per square meter. This difference is the water-absorption of the hydrophilic layers present on the emulsion side of the material.

For reaching the best sensitometric properties, in a photographic material to be used according to the present invention, it is preferred to use in said material two or more, but preferably two, monodisperse cubic emulsions as decribed above, displaying differences in speed. Said two emulsions can be mixed and this mixture coated. It is preferred for the material according to the present invention to coat two or more, most preferably two, emulsion layers each comprising a monodisperse cubic emulsion, as described above, having a different speed are coated on the support. In the most preferred embodiment the material comprises two emulsion layers with different speed with the layer with the higher speed (emulsion A) farthest away from the support. The faster emulsion is preferably between 0.10 log E and 0.50 log E faster than the slower emulsion (emulsion B). (I.e. a factor between 1.25 and 3.2 faster). Most preferably the faster emulsion is between 0.20 log E and 0.45 log E faster (i.e. a factor between 1.55 and 2.80 faster). The speed of the emulsions is measured by exposing and developing materials comprising only one of the separate emulsions according to TEST B and comparing the relative speed of the separate emulsions at density $D_{gev}$ equal to:

$$\frac{(D_{max} - D_{min})}{2}$$

TEST B

The material, the composition of which will be described furtheron, is exposed by a laser of the same type as the one used in the laser imager for which the material is designed. The material is brought into contact with a calibrated stepwedge in a holder, the temperature of which can be changed from 14° to 40° C. and accurately controled. The temperature of the holder is set and controled at 25° C. The laser beam, with diameter ($\Phi 1/e^2$) 115 μm, is scanned over the material and stepwedge with a mirror having 127 oscillations pro second, the line overlap is 30% and the exposure time for each pixel (laser point) is 470 nsec. After exposure the material is processed in a dry-to-dry processing cycle of 45" in Curix HT530 developing machine (Curix HT530 is a trademark of Agfa-Gevaert) with G138, trade name product of Agfa-Gevaert as developer and with G334, trade name product of Agfa-Gevaert as fixer. The developer has a temperature of 38° C.

It is known in the art of silver halide photography that the speed of a silverhalide emulsion can be adjusted by different means, e.g. differences in average grain size, a higher or lower degree of chemical ripening, more or less spectral sensitizer. For the different emulsion layers contained in a silver halide material according to the present invention, it is preferred to use different doses of spectral sensitizer while keeping grain size and degree of chemical sensitization of both emulsions equal.

In another embodiment of the invention, said two emulsion layers are separated by an intermediate layer comprising a dye absorbing light of the wavelength of the laser (a anti-halation dye) used to print the image onto the silver halide material. Said layer absorbs preferably between 20 and 70% of the laser light reaching said layer, more preferably said layer absorbs between 35 and 65% of said laser light.

The preparation of preferred emulsions, preferred embodiments for chemical ripening, stabilizing, spectral sensitizing of said emulsions, various other addenda (anti-halation dyes, surfactants, coating aids, development accelerators, plasticizers, spacing agents, thickening agents, etc) to said emulsions and methods for coating the emulsion layers according to the present invention can be found in EP-A 610 608, that is incorporated herein by reference.

When the information, contained in the portions, $Por_{L0}$, $Por_1$, $Por_{L1}$ and $Por_2$, of the diagnostically useful window is printed by an imagewise modulated thermal printheads, the printing can proceed via two mechanisms:

1. Direct thermal formation of a visible image pattern by imagewise heating of a recording material containing matter that by chemical or physical process changes colour or optical density.

2. Thermal dye transfer printing wherein a visible image pattern is formed by transfer of a coloured species from an imagewise heated donor element onto a receptor element.

In direct thermal printing, said heating of the recording material may be originating from the image signals which are converted to electric pulses and then through a driver circuit selectively transferred to a thermal printhead. The thermal head consists of microscopic heat resistor elements, which convert the electrical energy into heat via the Joule effect. The electric pulses thus converted into thermal signals manifest themselves as heat transferred to the surface of the thermal paper wherein the chemical reaction resulting in colour development takes place. This principle is described in "Handbook of Imaging Materials" (edited by Arthur S. Diamond—Diamond Research Corporation—Ventura, Calif., printed by Marcel Dekker, Inc. 270 Madison Avenue, New York, ed 1991, p. 498–499).

The recording medium used to represent radiological images according to the method of the present invention can advantageously be a recording medium based on thermal dye sublimation or diffusion transfer.

Thermal dye sublimation transfer also called thermal dye diffusion transfer is a recording method in which a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resistors, or a laser, whereby dye from the selectively heated regions of the dye-donor element is transferred to the receiver sheet and forms a pattern thereon, the shape and density of which is in accordance with the pattern and amount of heat applied to the dye-donor element.

The receiver sheet for use in the thermal dye sublimation or diffusion process preferably comprises on a support an image-receiving layer having a dyeable resin, e.g., a polyvinylchloride, polyvinylacatetate, polyurethane etc. More details about thermal dye transfer process and the materials for use therein can be found in EP 400 706 and the references contained therein.

When the information, contained in the portions, $Por_{L0}$, $Por_1$, $Por_{L1}$ and $Por2$, of the diagnostically useful window is printed by an imagewise modulation in a Direct Electrographic Printing (DEP) device, it is possible to use any DEP device known in the art.

In DEP (Direct Electrostatic Printing) the toner or developing material is deposited directly in an imagewise way on a substrate, the latter not bearing any imagewise latent electrostatic image. The substrate can be an intermediate, in case it is preferred to transfer said formed image on another substrate (e.g. aluminum, etc.), but it is preferentially the final receptor, thus offering a possibility to create directly the image on the final receptor, e.g. plain paper, transparency, etc. . . . after a final fusing step.

Useful DEP devices have been disclosed in, e.g., U.S. Pat. No. 3,686,935, GB 2,108,432, DE 3,411,948 EP-A 266 960, U.S. Pat. Nos. 4,743,926, 5,202,704 etc.

When using a DEP device in a method according to the present invention, it is preferred to use a DEP-device wherein a multi-component developer is used comprising at least toning particles (toner particles) and magnetic attractable carrier particles and the toner is delivered by a magnetic brush assembly and a toner cloud is generated directly from said multi-component developer present at the surface of said magnetic brush assembly and said toner cloud is generated by an oscillating field. Such a device is disclosed in European Application 94200855.8 filed on Mar. 29, 1994.

When the information, contained in the portions, $Por_{L0}$, $Por_1$, $Por_{L1}$ and $Por2$, of the diagnostically useful window is printed by an imagewise modulated ink-jet device, the printing apparatus may use any type of ink known in the art, e.g., hot-melt inks, water-based inks, solvent-based inks etc.

The receiving sheet can be plain paper, pretreated paper or an opaque reflecting plastic support. When using an opaque reflecting plastic support it is preferred that the receiving sheet carries an ink-receiving layer. Ink receiving layers to be coated on a plastic support have been widely described, e.g. in EP 125 113, U.S. Pat. Nos. 4,547,405, 4,592,954, 4,741,969, EP 373 573, EP 411 638, U.S. Pat. No. 5,045,864, 5,126,194, etc. When water based inks are used in combination with a receiving sheet comprising an ink-receiving layer it is preferred to use ink-receiving layers as disclosed in EP-A 594 896 and EP-A 609 930.

I claim:

1. A method for representing X-ray images on a recording medium comprising an image recording layer and an opaque reflecting support characterized by the steps of:
   (i) recording said image directly in an digital form or recording said image as an analog image and transforming said analog image into a digital image,
   (ii) determining a raw image histogram of said digital image
   (iii) determining from said histogram the width of a diagnostically useful window
   (iv) dividing said useful window into several smaller windows, the width of said smaller windows being adapted to the dynamic range of said recording medium
   (v) feeding digital image data of each of said smaller windows to an imager
   (vi) printing the information content of each of said smaller windows onto said image recording medium.

2. A method according to claim 1, wherein said information content of each of said smaller windows is printed so as to have all images of said smaller windows together on a single sheet of said recording medium.

3. A method according to claim 1, wherein
   (i) said recording medium is a silver halide photographic material and
   (ii) said imager is a laser imager comprising a dry film handling/exposing section directly coupled to an automatic film processing section having a dry-to-dry cycle of less than 60 seconds.

4. A method according to claim 3, wherein said silver halide photographic material
   (i) comprises cubic silver bromide or silver bromoiodide crystals with an amount of at most 3 mole % of iodide and
   (ii) has a hardening degree corresponding with a water absorption of less than or equal to 8 g/m$^2$ at the emulsion side (TEST A).

5. A method according to claim 4, wherein 95% of said cubic silver bromide or silver bromoiodide crystals have a particle size that does not deviate more than 30% from the average particle size.

6. A method according to claim 3, wherein the total gelatin content at the emulsion side of silver halide photographic material is less than or equal to 4 g/m$^2$ and the silver content at the emulsion side, expressed as the equivalent amount of silver nitrate, is less than 4 g/m$^2$.

7. A method according to claim 6, wherein said silver halide photographic material comprises a support and two different emulsion layers (A and B).

8. A method according to claim 7, wherein said two different emulsion layers (A and B) have a different speed and wherein the emulsion layer farthest from said support is a factor between 1.25 and 3.2 faster than the emulsion layer closest to said support.

9. A method according to claims 7, wherein said silver halide photographic material comprises a support and two emulsion layers separated by an intermediate layer comprising a dye absorbing the light of the wavelength of the laser (an anti-halation dye) used to print the image onto the silver halide material.

10. A method according to claims 9, wherein said intermediate layer, comprising a dye absorbing the light of the wavelength of the laser, absorbs between 20 and 70% of the laser light reaching said layer.

11. A method according to claim 7, wherein said two emulsion layers (A and B) have a different silver content and the relative silver content in said different emulsion layers ($Ag_A$ and $Ag_B$) is such that $0.3 \leq Ag_B/Ag_A \leq 3$.

12. A method according to claim 1, wherein said imager comprises imagewise modulated thermal printheads.

13. A method according to claim 1, wherein said imager comprises an imagewise modulated ink-jet device.

14. A method according to claim 1, wherein said imager comprises a Direct Electrographic Printing (DEP) device.

15. A method according to claim 1, wherein said imager provides an electrostatic latent image on a charge retentive surface.

* * * * *